United States Patent Office 3,481,773
Patented Dec. 2, 1969

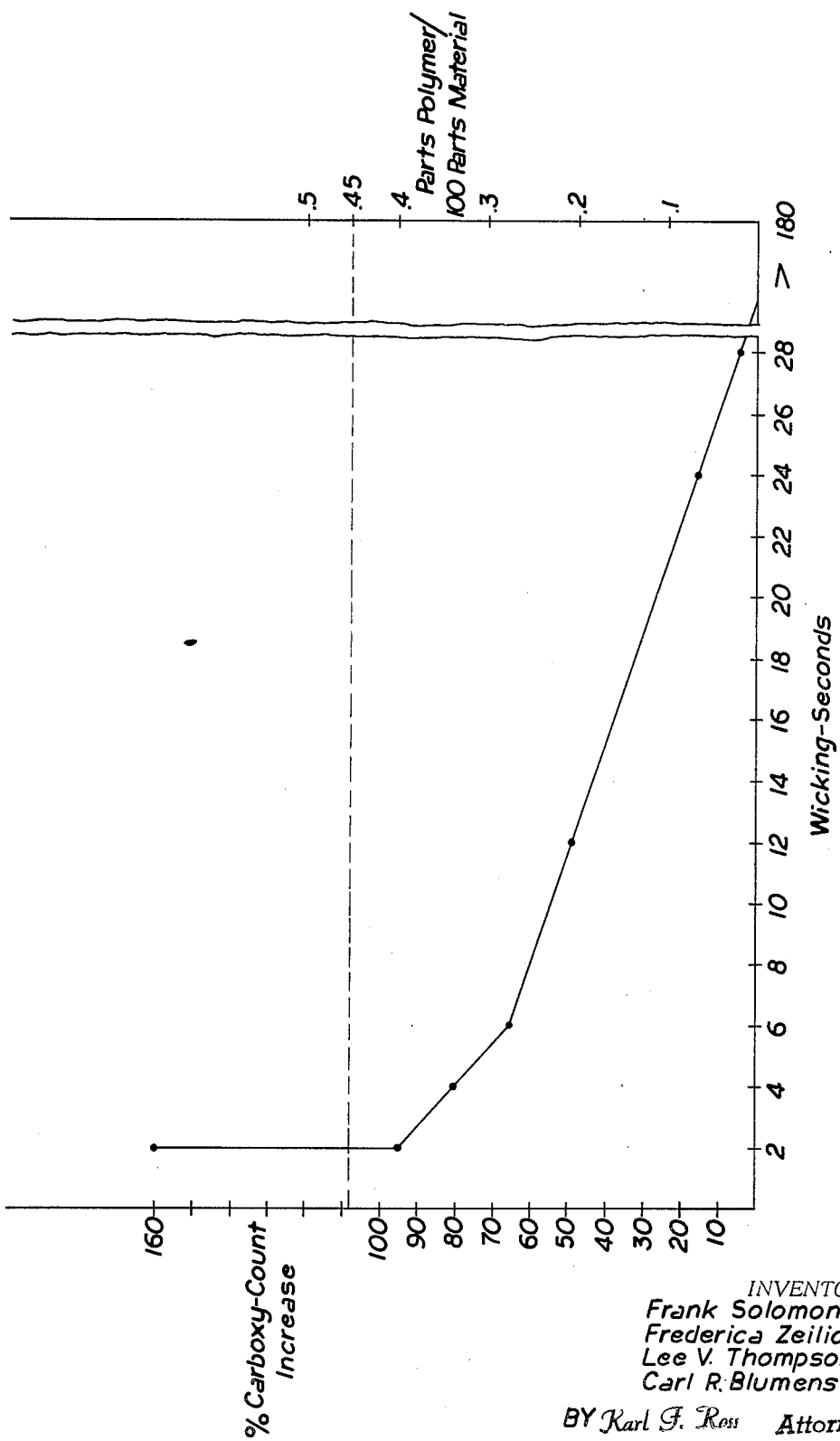

3,481,773
PROCESS AND COMPOSITION FOR TREATING POLYAMIDE SUBSTANCE AND RESULTANT HYDROPHILIC PRODUCT
Frank Solomon, Lake Success, and Frederica Zeilicof, Elmhurst, N.Y., and Lee V. Thompson, Atlanta, and Carl R. Blumenstein, Marietta, Ga., assignors to Yardney International Corporation, New York, N.Y., a corporation of New York
Filed Aug. 2, 1965, Ser. No. 476,607
Int. Cl. B44d 1/22, 1/09; C09d 3/64
U.S. Cl. 117—139.5
4 Claims

ABSTRACT OF THE DISCLOSURE

Treatment of polyamide textiles by applying thereto an aqueous solution of low pH containing an acrylic polymer together with an anionic and/or nonionic surfactant, preferably an alkylphenol polyoxyethylene mono- and diphosphate ester mix, the weight of the surfactant not exceeding that of the polymer, with heating of the treated textile material to fix the polymer thereon and to give it a pliant, durable and water-absorbent finish.

---

This invention relates to hydrophilic polyamide substances and to a treatment and compositions for producing the same. It further relates to polyamide substances which exhibit durable wettability properties, retaining the same even after repeated launderings.

In commonly assigned U.S. Patent No. 3,297,786 there is described a method for improving the wettability and decreasing the electrostatic character of polyamide fibers by the graft polymerization thereto of vinylic or ethylenic monomers. Such systems have been proposed of late as potential solutions to the problems in handling hydrophobic materials, such as nylons, and seek to render the latter more or less hydrophilic by catalytic bonding of a graft-polymerizable agent to the polyamide backbone. These methods have not been completely satisfactory for adaptation to textile mill practice because of the requirement of extremely close control of the process variables. Such parameters as catalyst concentration, pH, polymerization temperature, and presence of catalyst-poisoning agents are difficult to control in commercial practice and thus costly procedures are required to achieve uniform and reproducible products.

Others have indicated that a "hydrophilant" treatment of this character can be effected by subjecting the backbone polymer, in the presence of a polymerizable vinylic compound such as monomeric acrylic acid, to high-energy radiation from, for example, a Van de Graaf generator. Arrangements of this latter type are inefficient for large-scale treatment of fabrics and are not adaptable for use in textile mills or the like during the usual production of the fabric. For these reasons, the techniques described above have not found widespread application in the treatment of nylon fabrics.

It should also be noted that there have been proposals heretofore for the sizing and treatment of various filaments and yarns to impart stiff, crisp finishes to textile materials. Finishes of this type have made use of aqueous solutions of polyacrylic acid alone or in combination with a polyhydric alcohol or other additives. Some of these finishes remained removable while others were more durable depending on the methods of application. Typical finishes of this type are disclosed in U.S. Patents Nos. 2,692,182; 2,899,341; and 3,048,554.

It is a principal object of the present invention to provide soft, pliant polyamide substances having hydrophilic characteristics.

It is a further object of the invention to provide soft, pliant hydrophilic polyamide substances having durable, wetting properties.

Another object of the present invention is to provide a process for the treatment of polyamide materials which imparts durable moisture-absorbency thereto and/or decreases their capacity to retain static electricity.

Another object of this invention is to provide a composition for the treatment of polyamide substances which will improve the wetting and antistatic characteristics thereof at relatively low cost.

Another object of our invention is to provide a process for the treatment of polyamide fabrics and yarns which improves the appearance, hand and moisture-absorbency thereof and which can be carried out without significant difficulty with regard to control of the application of the composition to the material.

These objects and others which will become apparent hereinafter are attained by treating a nylon substrate with an aqueous treating solution which increases the carboxy count and greatly increases the wetting or water-absorbency characteristics of the nylon without increasing the stiffness of the article.

Surprisingly, it was discovered that an aqueous treating solution comprising acrylic acid polymer and optionally a surfactant, when applied to polyamide materials under certain conditions and in certain quantities, would provide a durable, pliant finish to the nylon, and furnish a sufficient increase in carboxy count to greatly increase the moisture-absorbency of the finished article. Even more surprisingly, it was discovered that the treating composition and process of the present invention may be used concurrently with other, conventional treatments practiced by textile mills in finishing nylon fabrics, thereby requiring no additional processing steps or equipment with the attendant expense. Furthermore, the composition and process of the present invention provides a soft, pliant polyamide article with greatly increased wettability which is retained even after repeated launderings.

After application of the aqueous treating solution and drying of the treated polyamide material, the polyamide exhibits hydrophilic characteristics as evidenced by the greatly increased wettability of a treated polyamide fabric wherein the absorption of water droplets takes place at a rate 100 times or more than that of an untreated fabric. Moreover, the treatment also appears to physically affect the fabric and microscopic examination thereof shows that the yarn filaments are ballooned outwardly and the yarn expands to impart to the fabric structure a softer feel and more pleasant hand than that of similar non-treated fabrics. Additionally, the fabric has a substantially reduced resistivity and, therefore, decreased tendency to retain electrostatic charge. Furthermore, an increased dye-deceptiveness rate has been indicated for the treated fabric when compared to nontreated fabric. This increased rate is of particular economic advantage in end uses, such as for carpets and felts, where present dyeing cycles are long. In such uses the increased dyeing rate also tends to improve the dyeing uniformity.

The aqueous treating solution of the present invention is highly effective with synthetic linear polyamides commonly referred to as nylon. The term "nylon" as used herein is intended to include the polyamides designated as nylon 6, nylon 66, and nylon 610 as well as other common nylon fibers.

The sole figure of the accompanying drawing is a graph illustrating the effect of this invention.

Fabrics of polyamide material, known generally as nylon 6 and nylon 66 and having a carboxy count of 60 and 92 respectively, expressed as equivalent carboxy per $10^6$ grams of nylon, were treated with an aqueous solution comprising polyacrylic acid and conventional fabric-loading agents at a pH of 1 to provide treated fabrics retaining different amounts of polyacrylic acid.

The wetting capability and the percent increase in carboxy count was determined for each of the treated fabrics and is plotted against the amounts of polyacrylic acid retained by the fabric as illustrated in the graph.

The wetting capability is determined by applying a uniform-size drop of water to the fabric conditioned to equilibrium of 65% relative humidity at a temperature of 70° F. and measuring the time required for the drop of water to completely wick into the fabric.

It will be observed from the graph that even a slight percentage increase in carboxy count over the original carboxy count greatly improves the wettability of the fabric. It can also be seen that no further improvement in wettability is evidenced after an increase in carboxy count of approximately 100%. It is further observed that this improvement in wettability is accomplished with a retention of polyacrylic acid by the fabric of not more than 0.45 part per 100 parts by weight.

The process of this invention finds particular usefulness in the treating and producing of nylon fabric material for subsequent converting into wearing apparel. The hydrophilic character of the treated fabric is especially appealing in those situations, among others, where it is used in items of apparel which are worn next to the body. In such instances, the softer feel and increased affinity for moisture greatly enhances the physical as well as the psychological feeling of comfort. Such fabrics usually are composed, at least in part, of nylon fibers preferably from the groups which consist of capiolactam-poly-condensation resins and condensation products of hexamethylenediamine with adipic or sebacic acids.

Prior to treating the polyamide material, it may be scoured with conventional scouring detergents and/or an alkaline solution. The treating solution also may be applied by known methods. In the case of a nylon fabric being treated at a typical textile mill, the solution may be applied by conventional padding, suction, spraying or immersion methods.

The acrylic acid polymer may be polyacrylic acid itself, polymethacrylic acid, and polymerized substituted acrylic acids of medium to high molecular weight soluble in water. While it is difficult to determine the chain length of the acrylic acid polymer, it may be stated that a 50% solution thereof in water should advantageously have a viscosity ranging between substantially 10,000 and 3,500 cps. at 20° C. and that an average molecular weight of substantially 40,000 to 180,000 is desirable.

According to the present invention, nylon material is treated with an aqueous solution comprising an acrylic acid polymer having a pH maintained at 3 or less. The hydrogen-ion concentration is such as to direct the fixing of the acrylic acid polymer in its non-dissociated form on the nylon article. At a pH higher than 3 the durable effect of the wicking action is not maintained through repeated launderings.

The amount of acrylic acid polymer in the treating solution and the conditions and length of treatment are adjusted to provide a solids pick-up of the acrylic acid polymer of not more than 0.45% by weight of the nylon. In general it has been found advantageous to adjust the compositions of treating solution and the conditions of treatment so as to permit a wet pickup of the treating solution in the range of 50 to 100% by weight of the polyamide material.

As is seen by referring to the graph a solids pickup of more than 0.45% of the acrylic acid polymer contributes nothing to the wettability characteristics of the nylon fabric and, as is well known in the art, heavier coatings of acrylic acid polymer increase the stiffness and hand, and are normally used for such effect. Within the limits and under the conditions set forth by the present invention, small amounts of acrylic acid polymer coatings have a negligible effect in so far as tending to increase the stiffness of the treated fabric.

When the treated fabric may be subjected to repeated launderings exceeding 10 or more times, it has been found advantageous to add a small amount of an anionic or nonionic surface active agent. The surface active agent should be present in the aqueous treated solution in an amount, by weight, less than that of the acrylic acid polymer. Preferably the amount of the acrylic acid polymer should be in the range of 3 to 5 parts to 1 to 2 parts for the surfactant.

In such proportions, the surfactant aids in retaining the wicking characteristic of the treated fabric through numerous launderings. In greater proportions, the surfactant appears to mask the effect of the acrylic acid polymer and the wicking capability decreases greatly after the first laundering.

Typical of the anionic or nonionic surface-active agents which have proved useful are polyoxyethylene-alkylphenol, and the mono- and disphosphate esters thereof, free acids of sulfated alkylphenoxy polyethyleneoxy ethanol, free acids of sulfated alkyloxy polyethleneoexy ethanol, free acids of phosphated alkylphenoxy polyethyleneoxy ethanol, and free acids of phosphated alkyloxy polyethyleneoxy ethanol.

As mentioned hereinbefore, a particular advantage of the present composition and process is its adaptability to be used concurrently with finishing processes and equipment presently utilized in the textile industry. These features are illustrated in the following examples which more fully demonstrate how the present invention can be used in practice.

EXAMPLE I

A nylon tricot fabric produced in the mill is thoroughly scoured in a conventional solvent-type scouring bath in conjunction with an alkaline builder, such as sodium carbonate, to remove spinning oils, fiber lubricants and any oil, grease or soil which may have been picked up during its processing and conversion into the fabric. The scoured fabric, after rinsing and drying, is given a pad application of an aqueous treating solution consisting of 0.6 part of high-molecular-weight polyacrylic aicd, 0.15 part of a surfactant (an alkylphenol polyoxyethylene, mono- and diphosphate ester) and 99.25 parts of water. Prior to treatment, the treating solution was adjusted to a pH of 2 with sulphuric acid. The padding operation was so conducted that approximately a 60% wet pickup is obtained based on the weight of the fabric resulting in 0.36 part of polyacrylic acid being retained per 100 parts by weight of the fabric.

After the padding application, the treated fabric was heated at a temperature in the range of 275 to 300° F. for three minutes to completely dry the fabric and fix the treating composition.

The treated fabric and a control were subjected to multiple washings and rinsings in a conventional, home-type washing machine, using a conventional detergent ("Tide"), and then were tested for wettability and resistivity. The results of these tests are tabulated below.

|  | Treated Fabric | | | Untreated Fabric | | |
| --- | --- | --- | --- | --- | --- | --- |
| Washings | 0 | 10 | 25 | 0 | 10 | 25 |
| Wetting, seconds | 2-3 | 2-3 | 3-5 | >300 | >300 | >300 |
| Resistivity, ohms | 8.7×10⁶ | | | 5.7×10⁷ | | |

The treated fabric showed no detectable increase in stiffness while presenting a soft, more pleasant hand than the untreated control.

EXAMPLE II

A nylon tricot fabric pre-scoured with a conventional scouring agent was treated in a squeeze roll padder applicator with an aqueous treating solution having a pH of 3 and the following formulation:

| | Parts |
|---|---|
| Polyacrylic acid | 2.0 |
| Anionic surfactant (phosphated alkylphenoxy polyethyleneoxy ethanol) | 0.5 |
| Non-ionic softener (Dexene HM 49) | 10.0 |
| Water | 822.5 |

The application was conducted to give a 60% wet pick-up based on the weight of the fabric which resulted in a solids pickup of 0.14 part of polyacrylic acid per 100 parts by weight of the nylon fabric. The fabric was then passed to a tenter-frame dryer and held at a temperature of 400° F. for 15 to 20 seconds. The fabric was then conditioned for 4 hours at 65% relative humidity and a temperature of 70° F. and then tested for wettability, using the water-drop test method described hereinbefore.

As a control for the so treated fabric, the same type of fabric was given a conventional textile-finishing treatment using the same process steps and subsequent conditioning. Both fabrics also were tested for wettability following five machine washes and ten machine washes using a conventional detergent ("Tide"), each followed by a hot-water rinse.

| | Treated Fabric | | | Untreated Fabric | | |
|---|---|---|---|---|---|---|
| Washings | 0 | 5 | 10 | 0 | 5 | 10 |
| Wetting, seconds | 9–10 | 1–2 | 1–2 | 22–25 | >300 | >300 |

The results of these tests illustrate that the treating composition of the present invention can significantly improve the moisture-absorbency of a polyamide fabric even though used in conjunction with conventional softener finishes, and that such improvement is retained and even enhanced upon being subjected to conventional home launderings during which conventional finishes are removed.

EXAMPLE III

A finishing treatment was prepared having the following formulation:

| | Parts |
|---|---|
| Urea | 25 |
| Epsom salts | 15 |
| Aqua ammonia (28%) | 2 |
| Water | 3285 |

To this solution was added 1.25 parts of a surfactant (alkylphenol polyoxyethylene mono- and diphosphate ester mix) and 5.00 parts of a high-molecular-weight polyacrylic acid. Nylon tricot fabrics composed of 40 denier, type nylon 66, were treated in a pad-nip finish box using squeeze rolls to give a solids pickup of polyacrylic acid in the range of 0.07 to 0.14 part per 100 parts per weight of the nylon fabric. The treating solution was adjusted with sulfuric acid to a pH of 3 prior to treating the fabric. The treated fabrics were passed through a gas-fired oven maintained at a temperature of 300 to 350° F. for drying and fixing of the polyacrylic acid to the fabric.

Subsequent wetting tests using the uniform-size-water-drop test gave corresponding wicking times in the range of 20 seconds to 7–8 seconds compared with a wicking time greater than 180 seconds for an untreated fabric.

We claim:
1. A process for applying a pliant, durable, water-comprises the steps of treating said material with an aqueous solution having a pH of not more than 3 and comprising (1) a polymer selected from the group consisting of polyacrylic acid, polymethacrylic acid and polymerized substituted acrylic acids, and (2) a surfactant wherein said polymer and said surfactant have a weight ratio ranging between 3:2 and 5:1, said surfactant being an alkylphenol polyoxyethylene mono- and diphosphate ester mix; controlling the treatment to provide a solids pickup of not more than 0.45 part by weight of said polymer to 100 parts by weight of said material; and heating the treated material at a temperature above 275° F. for a time sufficient to fix said polymer upon said material.

2. A process for providing a pliant, durable water absorbent finish to polyamide textile material which comprises the steps of:
   (1) scouring said material in a detergent alkaline bath;
   (2) rinsing and drying the scoured material;
   (3) treating said scoured material with an aqueous solution having a pH of not more than 3 and consisting essentially of by weight:
      (a) 25 parts—urea
      (b) 15 parts—Epsom salts
      (c) 2 parts—aqua ammonia (28%)
      (d) 5 parts—polyacrylic acid
      (e) 1.25 parts—alkylphenol polyoxethylene mono- and di-phosphate ester mix
      (f) 3285 parts—water;
   (4) controlling the treatment to give a solids pickup of the polyacrylic acid in the range of 0.07 to 0.14 part per 100 parts by weight of said scoured material; and
   (5) drying the treated material at a temperature of 300–350° F. to fix the polyacrylic acid to the material.

3. A treating composition consisting of an aqueous solution having a pH of 3 and comprising by weight 2 parts polyacrylic acid, 0.5 part phosphate alkylphenoxy polyethyleneoxy ethanol, 10.0 parts nonionic softener, and 822.5 parts water.

4. A treating composition consisting of an aqueous solution having a pH of 3 and comprising by weight 5.0 parts polyacrylic acid, 1.25 parts alkylphenol polyoxyethylene mono- and diphosphate ester mix surfactant, 25 parts urea, 15 parts Epsom salts, 2 parts aqua ammonia (28%) and 3285 parts water.

References Cited

UNITED STATES PATENTS

| 2,385,110 | 9/1945 | Seymour et al. | 260—29.6 X |
| 2,670,367 | 2/1954 | Lewis et al. | 260—953 X |
| 2,692,182 | 10/1954 | Nuessle et al. | 117—138.8 X |
| 2,723,237 | 11/1955 | Ferrin | 260—951 X |
| 2,899,341 | 8/1959 | Dawson | 117—139.5 X |
| 2,983,628 | 5/1961 | Hennemann et al. | 117—139.5 |
| 3,000,758 | 9/1961 | Hennemann et al. | 117—139.5 X |
| 3,048,554 | 8/1962 | Dreisbach et al. | 260—29.6 |
| 3,056,744 | 10/1962 | Copes et al. | 117—139.5 X |
| 3,105,500 | 10/1963 | Wilson et al. | 117—139.5 X |
| 3,297,471 | 1/1967 | Traumann | 117—138.8 X |

WILLIAM D. MARTIN, Primary Examiner

J. E. MILLER, Assistant Examiner

U.S. Cl. X.R.

8—115.6; 117—138.8, 161; 260—29.6